UNITED STATES PATENT OFFICE.

CONSTANT V. CLOLUS, OF PARIS, FRANCE.

TREATMENT OF THE SALINE LIQUORS RESULTING FROM SOAP-MANUFACTURE IN ORDER TO EXTRACT THE MATTERS CONTAINED THEREIN.

SPECIFICATION forming part of Letters Patent No. 242,272, dated May 31, 1881.

Application filed March 9, 1881. (No specimens.)

*To all whom it may concern:*

Be it known that I, CONSTANT VICTOR CLOLUS, of Paris, in the Republic of France, have invented certain new and useful improvements in the treatment of saline liquids resulting from soap-manufacture for the purpose of extracting therefrom different salts, glycerine, and fatty matters contained therein, of which the following is a specification.

The liquids resulting from the manufacture of all sorts of hand-soap made with neutral fatty bodies contain in very variable proportions water, glycerine, caustic soda, carbonate of soda, sometimes sulphates and salts of potash, and always small quantities of more or less oxidized fatty acids. To obtain an industrial separation of these different bodies, and above all to extract therefrom the glycerine, I first saturate these liquors, cold, with hydrochloric acid to the point of neutralization. The fatty bodies precipitate themselves and are collected. The clear neutral liquid is then evaporated in any suitable furnace or evaporating apparatus. In proportion to the evaporation the salt precipitates. It is then taken out, subjected to the action of a centrifugal separator, and washed. In most cases this salt is nearly pure chloride of sodium. The evaporation is stopped when the liquid attains a density of about 32° Baumé. At this degree the glycerine contained in the liquor holds in solution considerable quantities of salt, the greater part of which is eliminated by the following treatment: the glycerinous liquor, at about 32° Baumé, is turned into any suitable reservoir, in which hot air is blown through it, or in which it is heated and has cold air blown through it. The air carries off to the last traces the water contained in the glycerine, and there is meanwhile constant precipitation of salt, because the latter is relatively less soluble in anhydrous glycerine. The water might be evaporated from the glycerine *in vacuo;* but that would be more expensive. I obtain, then, as the final result of the evaporation, a highly-concentrated glycerine mixed with crystals of salt. This is subjected to a centrifugal separator to extract the salt, and is washed, the washing-water being afterward treated in the same manner as the soap-liquors.

Instead of effecting the separation of the salt by centrifugal action, it may be effected by dialysis.

I employ another mode of working when I wish to collect the salts of soda in the state of carbonates instead of transforming them by hydrochloric acid into chlorides. To this effect I evaporate the soap-liquors by introducing thereinto carbonic acid to carbonate the caustic soda therein contained. When the liquor shows a density of about 25° Baumé I cool it and introduce an excess of carbonic acid. Bicarbonate of soda is thus formed, which is very little soluble in glycerinous solution. The greater portion of this precipitates itself and is extracted by a centrifugal machine. The bicarbonate is next transformed into carbonate by calcination. The glycerinous liquor which leaves the centrifugal machine is treated as has been previously described.

In case it be desired to obtain a glycerine more free from salt I operate as follows: To the glycerine concentrated either by blowing hot air through it or by evaporation *in vacuo,* I add hydrochloric acid in excess, either in the gaseous state or in a liquid state concentrated to about 22° Baumé. The chloride of sodium, being almost insoluble in an excess of hydrochloric acid, precipitates itself in fine crystals, and is separated by the centrifugal machine. The excess of hydrochloric acid then remaining in the glycerine is separated either by blowing air through it or by the introduction into it of oxide of lead in excess.

What I claim as my invention is—

1. The treatment of saline liquors resulting from the manufacture of soap by hydrochloric acid or carbonic acid, or by these two acids simultaneously, for the purpose of separating the salts and the fatty bodies therein contained, substantially as herein described.

2. The ulterior treatment of the liquid by evaporation, substantially as herein described.

3. The treatment of the liquor by blowing air through it, substantially as and for the purpose herein set forth.

4. The precipitation of the chloride of sodium in the glycerine by hydrochloric acid in excess, substantially as herein described.

CONSTANT VICTOR CLOLUS.

Witnesses:
AUG. PARISOT,
J. ROSSÉ.